United States Patent
Höllriegl et al.

(10) Patent No.: US 10,173,382 B2
(45) Date of Patent: Jan. 8, 2019

(54) BLOW MOLDING MACHINE WITH INTERNAL TEMPERING DEVICE

(71) Applicant: Krones AG, Neutraubling (DE)

(72) Inventors: Thomas Höllriegl, Teublitz (DE); Andreas Brunner, Aufhausen (DE)

(73) Assignee: Krones AG, Neutraubling (DE)

( * ) Notice: Subject to any disclaimer, the term of this patent is extended or adjusted under 35 U.S.C. 154(b) by 921 days.

(21) Appl. No.: 13/946,671

(22) Filed: Jul. 19, 2013

(65) Prior Publication Data

US 2014/0021657 A1 Jan. 23, 2014

(30) Foreign Application Priority Data

Jul. 20, 2012 (DE) .................. 10 2012 212 773

(51) Int. Cl.
*B29C 49/36* (2006.01)
*B29D 22/00* (2006.01)
*B29C 49/64* (2006.01)

(52) U.S. Cl.
CPC ............ *B29D 22/003* (2013.01); *B29C 49/36* (2013.01); *B29C 49/64* (2013.01)

(58) Field of Classification Search
CPC ............................... B29C 49/36; B29C 49/64
USPC .................................................. 264/39, 523
See application file for complete search history.

(56) References Cited

U.S. PATENT DOCUMENTS

| 2010/0327474 | A1 | 12/2010 | Hirdina | |
| 2011/0262574 | A1* | 10/2011 | Hoellriegl | B29C 49/4236 |
| | | | | 425/144 |
| 2013/0037996 | A1* | 2/2013 | Fuhrer | B29C 49/46 |
| | | | | 264/523 |

FOREIGN PATENT DOCUMENTS

| CN | 102159377 | 8/2011 | |
| CN | 102233668 | 11/2011 | |
| DE | 1014298 | 8/1957 | |
| DE | 19727278 | 1/1999 | |
| DE | 10142988 | 3/2003 | |
| DE | 20309576 | 10/2003 | |
| DE | 102008012757 | 9/2009 | |
| DE | 102008029531 | 12/2009 | |
| DE | 102009015519 | 10/2010 | |
| DE | 102010028253 | 10/2011 | |
| EP | 1537976 A1 * | 6/2005 | B26C 35/007 |
| EP | 2412512 | 2/2012 | |

OTHER PUBLICATIONS

English abstract of EP1537976.*
Chinese Patent Office Action for Application No. 201310306191.X dated Jun. 10, 2015 (9 pages, English translation only).
EP131719445 Extended European Search Report dated Oct. 7, 2013 (5 pages).

* cited by examiner

*Primary Examiner* — Christina A Johnson
*Assistant Examiner* — Xue Liu
(74) *Attorney, Agent, or Firm* — Michael Best & Friedrich LLP

(57) ABSTRACT

A blow molding machine with a stationary and a rotating part, comprising a tempering device for tempering blow molds of the blow molding machine using a medium, and a respective method, characterized in that the tempering device is arranged within the blow molding machine.

5 Claims, 1 Drawing Sheet

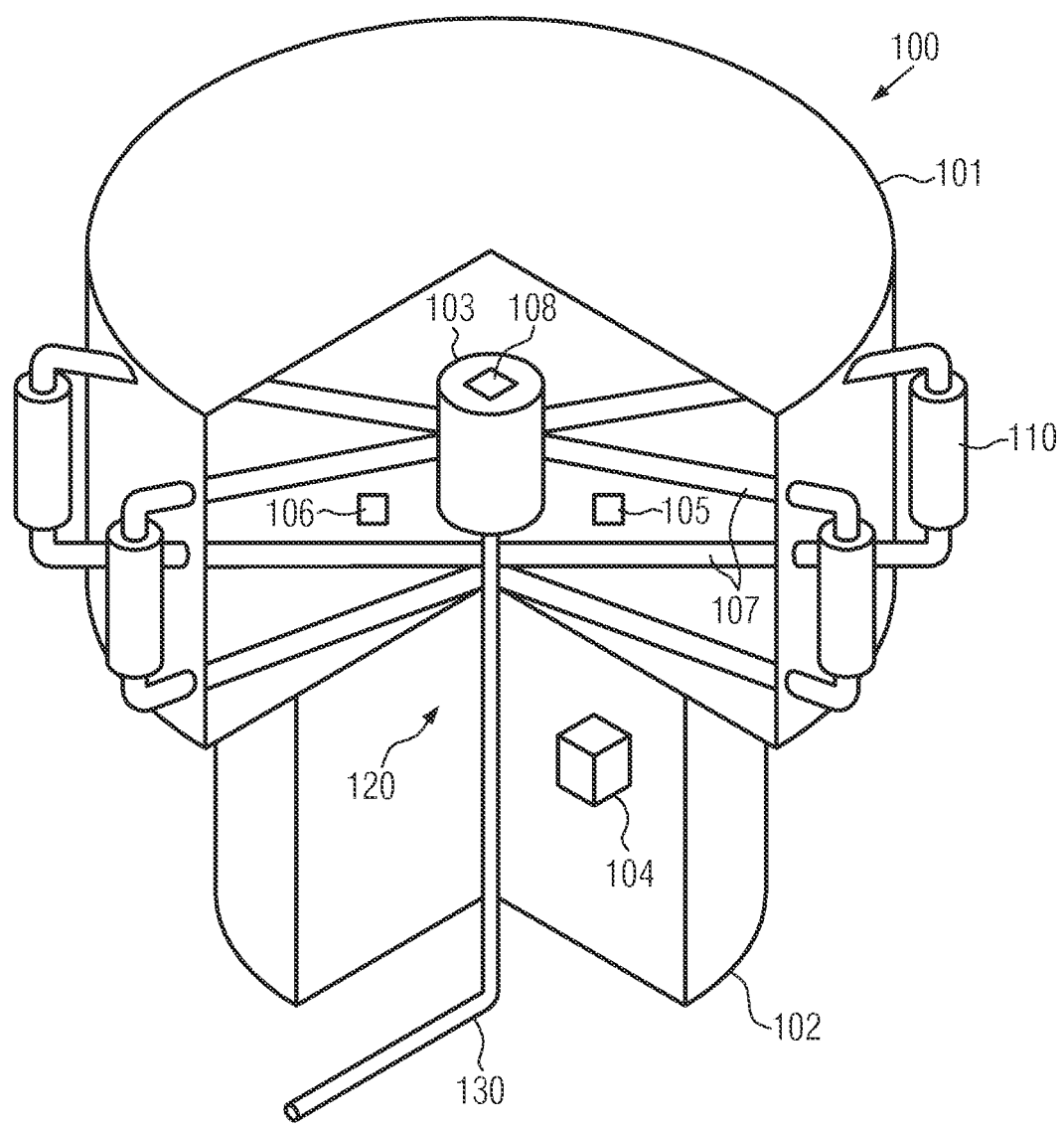

BLOW MOLDING MACHINE WITH INTERNAL TEMPERING DEVICE

BACKGROUND OF THE INVENTION

The invention relates to a blow molding machine with a tempering device and a respective method for tempering blow molds and their mounting fixtures (mold carrier) of a blow molding machine.

SUMMARY OF THE INVENTION

Blow molding machines are known from prior art. As in particular the blow molds must be cooled and the preforms must be heated, the use of heating stations and cooling elements in connection with blow molding machines is known e.g. from DE 20 309 576 U1. It discloses a blow molding machine for producing hollow bodies of thermoplastic material, where a heating station is provided for heating the preforms and cooling means for cooling the blow mold. The coolant is provided by a cooling unit, which relative to the dimensions of the blow machine is arranged at a greater distance from the blow molding machine. However, this requires a certain amount of space and leads to performance losses during transport of the cooling liquid.

The invention is characterized in that the blow molding machine, comprising a stationary and a rotating part with blow molds as well as a tempering device for tempering the blow molds, is characterized in that the tempering device is disposed within the blow molding machine. This firstly achieves significant space-saving, since, for example, no lines are necessary outside the blow molding machine for transporting the cooling liquid from the tempering device to the individual blow molds. Secondly, due to the arrangement of the tempering device immediately within the blow molding machine, any change of temperature of the medium during the transport to the blow mold can be effectively reduced or even avoided. As a result, costly insulation of the respective lines and intermediate stations for re-heating or cooling can be partially or completely obsolete.

In one embodiment, the blow molding machine is characterized in that the tempering device comprises a heating element, a cooling element, a control unit which can be integrated into the machine control unit, a water pump, a cooling water supply, and connections of the tempering device to one, preferably all blow molds of the blow molding machine. By arranging all components necessary for tempering and controlling the tempering within the blow molding machine, tempering can not only be performed more economically and space-saving, but in particular by arranging the control unit within the blow molding machine, respective connections (for example, cable and pipe, or hose lines) no longer need to be routed through the production hall in which the blow molding machine is located and risks such as, for example, damage to the respective lines can thereby be avoided.

In one embodiment, the blow molding machine is characterized in that the control unit is adapted to control the temperature of the medium used in the tempering device, such that formation of condensate can be reduced, preferably avoided. Avoiding the formation of condensate can significantly improve the lifetime of the blow molding machine, as, for example, rust or other material damage due to condensation on connection pipes can impair the operativeness of the blow molding machine. Furthermore, contamination by microorganisms is made more difficult because the necessary moisture on the surfaces is lacking.

In another embodiment, at least one of the heating element, the cooling element, the control unit, the cooling water supply, the water pump, the connections, and the control unit are provided in the stationary part of the blow molding machine and the others in the rotating part of the blow molding machine. A respective separation of the components can be advantageous, since, for example, provision of the cooling element and the connections in the rotating part of the blow molding machine makes flexible connections between the cooling element and the connections to the blow molds superfluous.

In one embodiment, the blow molding machine is characterized in that a secondary heating element is provided in the tempering device which is adapted to raise the temperature of the employed medium to a higher temperature. This secondary heating element is, for example, used to quickly bring the blow forms to operating temperature.

By using, for example, this device, a method for tempering blow molds of a blow molding machine can be realized, where the method is characterized in that tempering of the blow molds is performed by a medium being conveyed by the tempering device arranged in the blow molding machine. In using this respective method, significant space and in particular much energy can be saved.

In one embodiment, the method is characterized in that a secondary heating element being disposed in the tempering device raises the temperature of the medium to a temperature at which formation of condensate is reduced, preferably avoided, prior to setting the blow molding machine into operation. This can ensure that the medium is at a suitable temperature already prior to setting the blow molding machine into operation and, accordingly, a shorter start-up time of the blow molding machine is achieved.

In another embodiment, the method is characterized in that cold water is added to stabilize the temperature of the medium at a target temperature. If the temperature of the medium changes, for example, due to absorption of heat by the blow mold, then it can be achieved with the cold water that there is a quick reduction in the temperature to the desired target temperature.

In another embodiment, the cold water is added in dependency of the temperature of the blow mold. This allows specific control of cold water addition, and stabilization of the target temperature is adjusted to the current processes in the blow molding machine.

BRIEF DESCRIPTION OF THE DRAWING

FIG. 1 is a schematic illustration of a blow molding machine according to the invention

DETAILED DESCRIPTION

FIG. 1 illustrates a blow molding machine 100 according to the invention. It comprises a stationary part 102 and a rotating part 101. The blow molds 110 are arranged on the rotating part 101 of the blow molding machine 100. During the blow molding process, it is firstly necessary to temper the forms so that the introduced plastic can assume a corresponding shape and characteristics. On the other hand, it is thereafter necessary to cool the blow forms as quickly as possible, so that, for example, a change of molds can be performed. To ensure this, a tempering device 120 is provided. According to the invention, it can be arranged within both the stationary as well as the rotating part of the blow molding machine 102 or 101, respectively. It comprises a cooling water supply 103 which can be connected via a supply line 130 to an external water supply. Furthermore, heating and cooling elements 105 and 106, respectively, are provided. They are used for heating or cooling the medium, respectively, while it is supplied or discharged via the lines 107 to or from the blow molds and their mounting fixtures, respectively. The heating elements 105 or cooling elements 106, respectively, are presently shown only schematically, as various embodiments are possible. For example, it can be provided that the heating and cooling elements 105 and 106, respectively, are arranged concentrically around the supply or discharge lines 107, respectively, and can thereby effect heating or cooling along the entire length. On the other hand, it can also be provided that heating and cooling elements 105 and 106, respectively, are disposed in the stationary part 102 of the blow molding machine 100. The arrangement of the components can be such that a part of the system is held at a processing temperature, while the blow molds are simultaneously cooled down quickly in order, for example, to perform a mold change. The blow molds are subsequently again tempered to the processing temperature. This arrangement reduces the re-start time of the machine. The design of the heating elements 105 or the cooling elements 106, respectively, can also be very different. The heating element 105 can, for example, be provided as a microwave source, whereas the cooling element can be provided such that a control valve is first provided which conveys the hot water from the tempering circuit into a return. At the same time, cold water can be added to the system, for example, by a check valve, thereby reducing the overall temperature of the medium.

In addition, a secondary heating element 108 can be provided. It can, for example, be arranged at the cooling water supply 103 or already at the supply line 130. It is used to heat the medium to a temperature at which formation of condensate can be reduced or preferably avoided.

The arrangement of the components of the tempering device 120 as shown in FIG. 1 is by no means mandatory. As already mentioned, for example, the heating element and/or the cooling element 105 or 106, respectively, can also be arranged in the stationary part 102 of the blow molding machine 100. If the cooling element 106 comprises a valve for discharging hot water and a valve for introducing cold water, then it can also be provided that parts of the cooling element 106 are arranged in the stationary part 102 and other parts in the rotating part 101 of the blow molding machine 100. The arrangement of the secondary heating element 108 can also be varied. The secondary heating element can, for example, also be arranged at the lower end 100 or in the lateral rear region of the stationary part 102 of the blow molding machine 100, in order to increase the medium temperature of the coolant already from the supply line 130. It is also conceivable to likewise dispose the cooling water supply 103 in the stationary part 102 of the blow molding machine 100. In this case, as shown in FIG. 1, a central arrangement of the cooling water supply 103 is not necessary, and it could basically be positioned in any position in the stationary part 102 of the blow molding machine 100. A non-central arrangement would also be possible in the rotating part 101 of the blow molding machine 100.

What is claimed is:

1. A blow molding machine with a stationary part, a rotating part, and blow molds, comprising a tempering device adapted and provided for only tempering said blow molds by use of a medium, wherein said tempering device is disposed within said blow molding machine, and wherein said tempering device includes a heating element, a cooling element, a pump, a control unit, a cooling water supply, and connections to at least one of the blow molds of said blow molding machine, wherein the control unit, the heating element, the cooling element, the pump, a cooling water supply, and connections of said tempering device are provided in the stationary part of said blow molding machine.

2. The blow molding machine according to claim 1, wherein said control unit is integrated into a machine control unit.

3. The blow molding machine according to claim 1, wherein said control unit is adapted to control the temperature of said medium used in said tempering device, such that formation of condensate can be reduced.

4. The blow molding machine according to claim 1, wherein said control unit can control at least one process circuit.

5. The blow molding machine according to claim 1, wherein a secondary heating element is provided in said tempering device and adapted to raise the temperature of said employed medium to a temperature at which formation of condensate can be reduced.

* * * * *